US010811866B2

(12) United States Patent
Li et al.

(10) Patent No.: US 10,811,866 B2
(45) Date of Patent: Oct. 20, 2020

(54) NEGATIVE VOLTAGE DETECTION AND VOLTAGE SURGE PROTECTION

(71) Applicant: SEMICONDUCTOR COMPONENTS INDUSTRIES, LLC, Phoenix, AZ (US)

(72) Inventors: Leon Li, Beijing (CN); Eric Wu, Beijing (CN); WeiMing Sun, Beijing (CN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 336 days.

(21) Appl. No.: 15/904,506

(22) Filed: Feb. 26, 2018

(65) Prior Publication Data

US 2019/0267792 A1    Aug. 29, 2019

(51) Int. Cl.
*H02H 3/20* (2006.01)
*H02H 9/04* (2006.01)
*G05F 1/571* (2006.01)

(52) U.S. Cl.
CPC ............. *H02H 3/202* (2013.01); *G05F 1/571* (2013.01); *H02H 9/04* (2013.01)

(58) Field of Classification Search
CPC ........... H02H 3/202; H02H 9/04; G05F 1/571
See application file for complete search history.

(56) References Cited

U.S. PATENT DOCUMENTS

| 6,885,745 B1* | 4/2005 | Handforth | H04M 3/18 |
| | | | 379/399.01 |
| 2008/0278135 A1* | 11/2008 | De Lima Filho | G05F 1/575 |
| | | | 323/288 |
| 2008/0309320 A1 | 12/2008 | Chu et al. | |
| 2010/0201394 A1* | 8/2010 | Kobatake | G01R 31/31706 |
| | | | 324/750.3 |
| 2013/0162358 A1* | 6/2013 | Xiao | G05F 3/242 |
| | | | 331/66 |
| 2015/0061637 A1 | 3/2015 | Pigott | |
| 2017/0141714 A1* | 5/2017 | Looby | H02P 6/12 |
| 2018/0123583 A1* | 5/2018 | Singh | H03K 17/223 |

* cited by examiner

*Primary Examiner* — Scott Bauer
(74) *Attorney, Agent, or Firm* — Brake Hughes Bellermann LLP

(57) ABSTRACT

In a general aspect, a circuit can include a reference current generator configured to generate a first current signal representative of a threshold voltage. The circuit can also include a current comparator configured to mirror the first current signal, generate a second current signal representative of a received voltage and compare the second current signal to the first current signal. The current comparator can also be configured to provide a detection signal at a first logic value to indicate that the received voltage is below the threshold voltage when the comparison of the second current signal with the first current signal indicates that the received voltage is less than the threshold voltage.

18 Claims, 14 Drawing Sheets

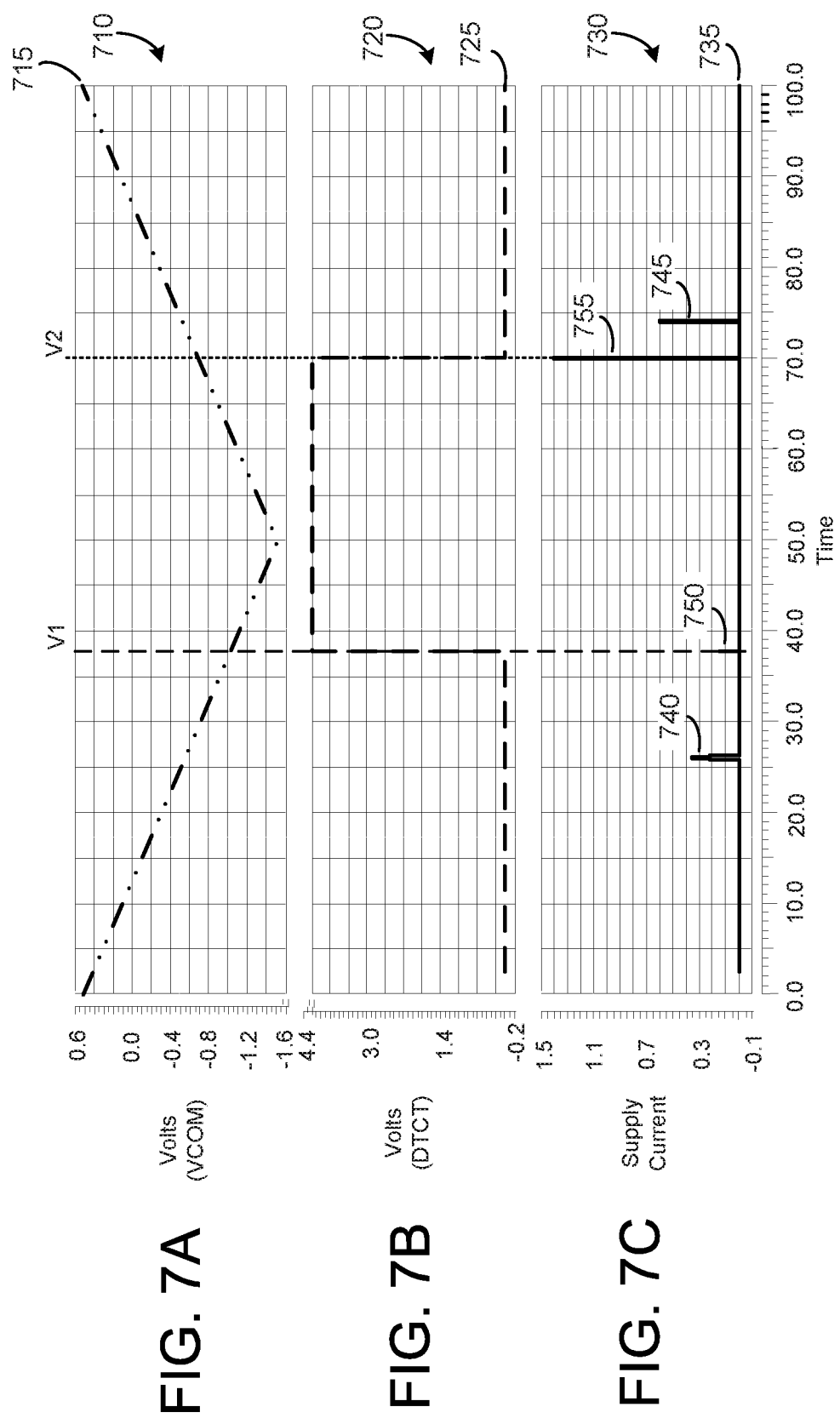

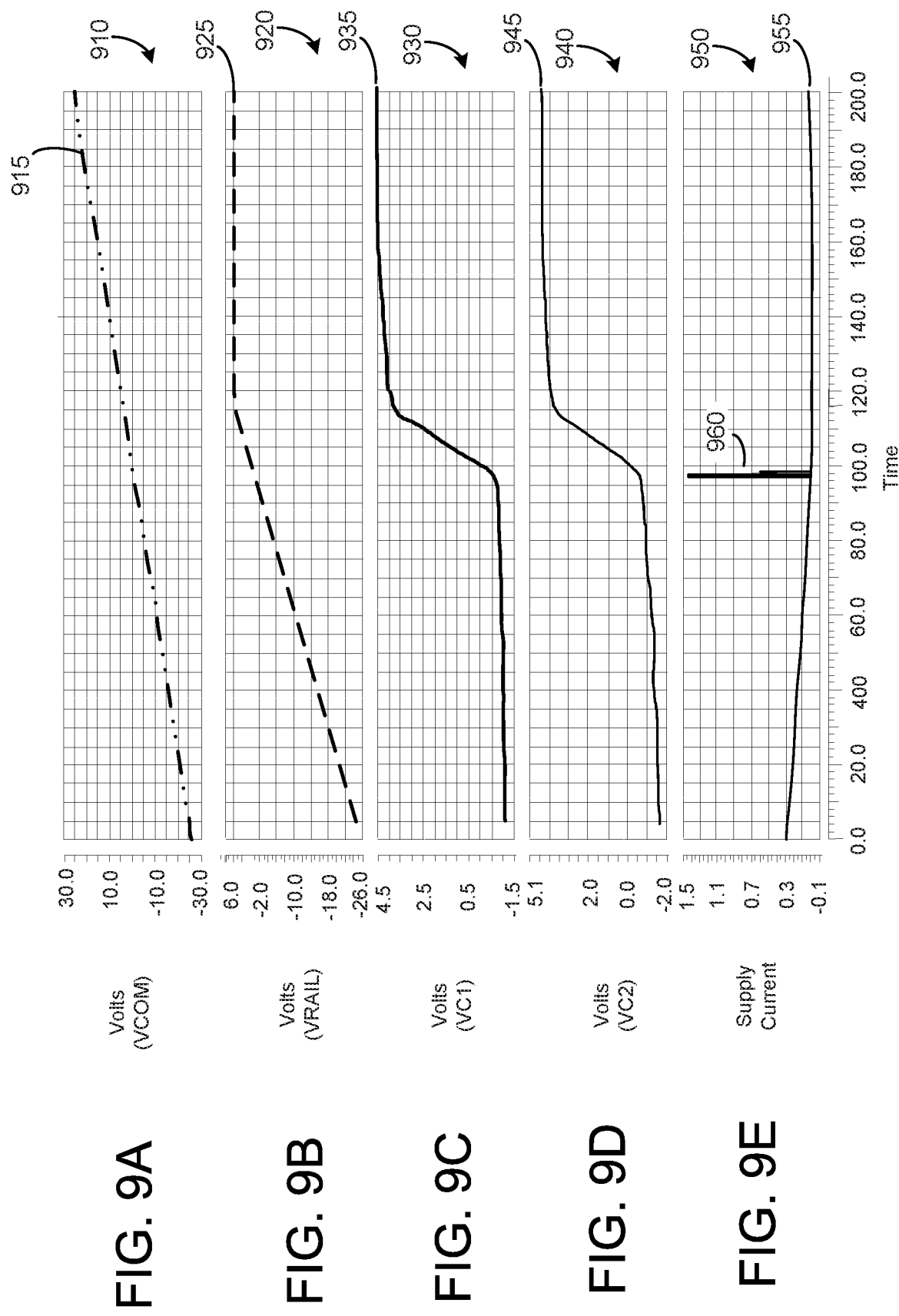

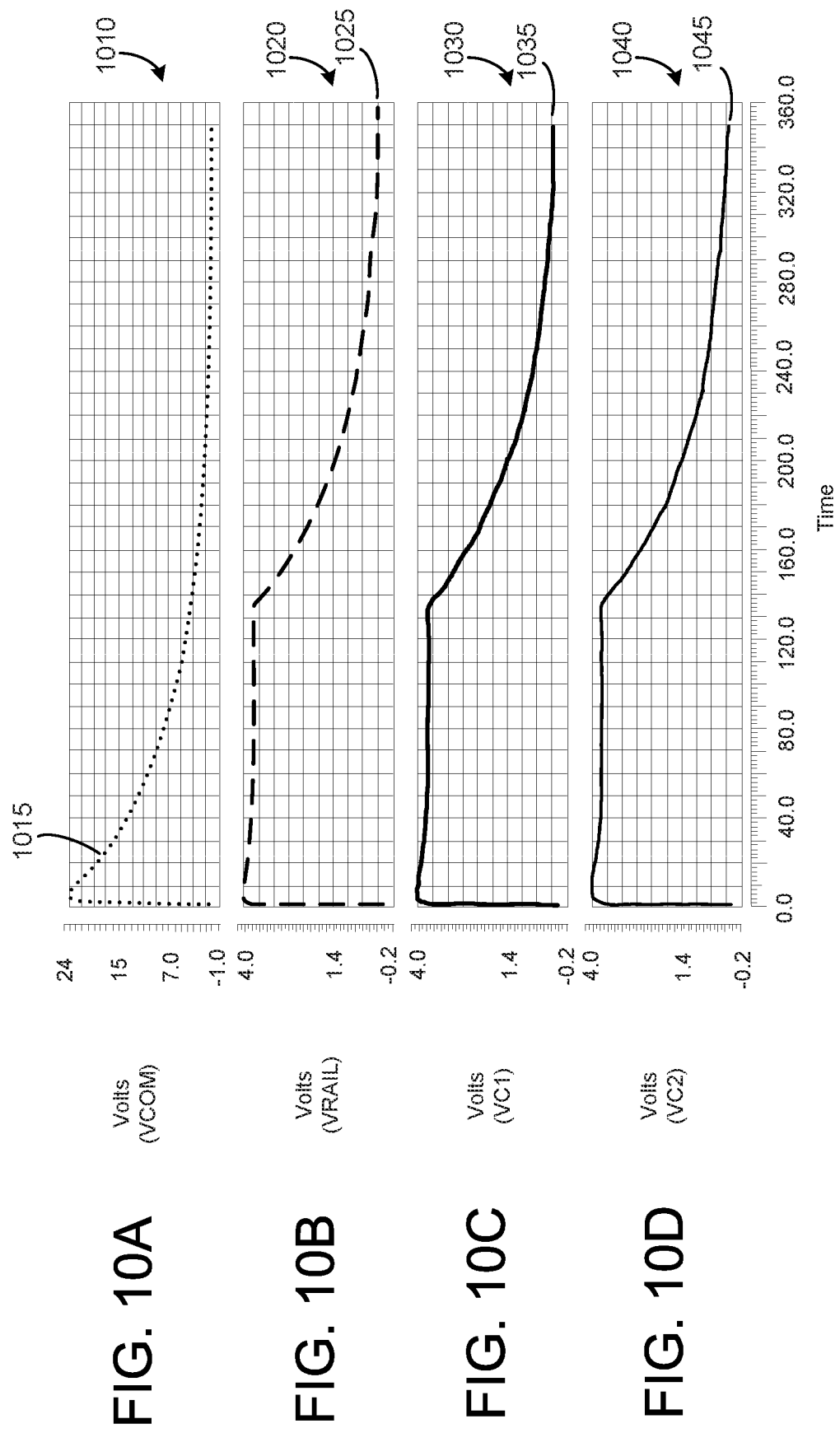

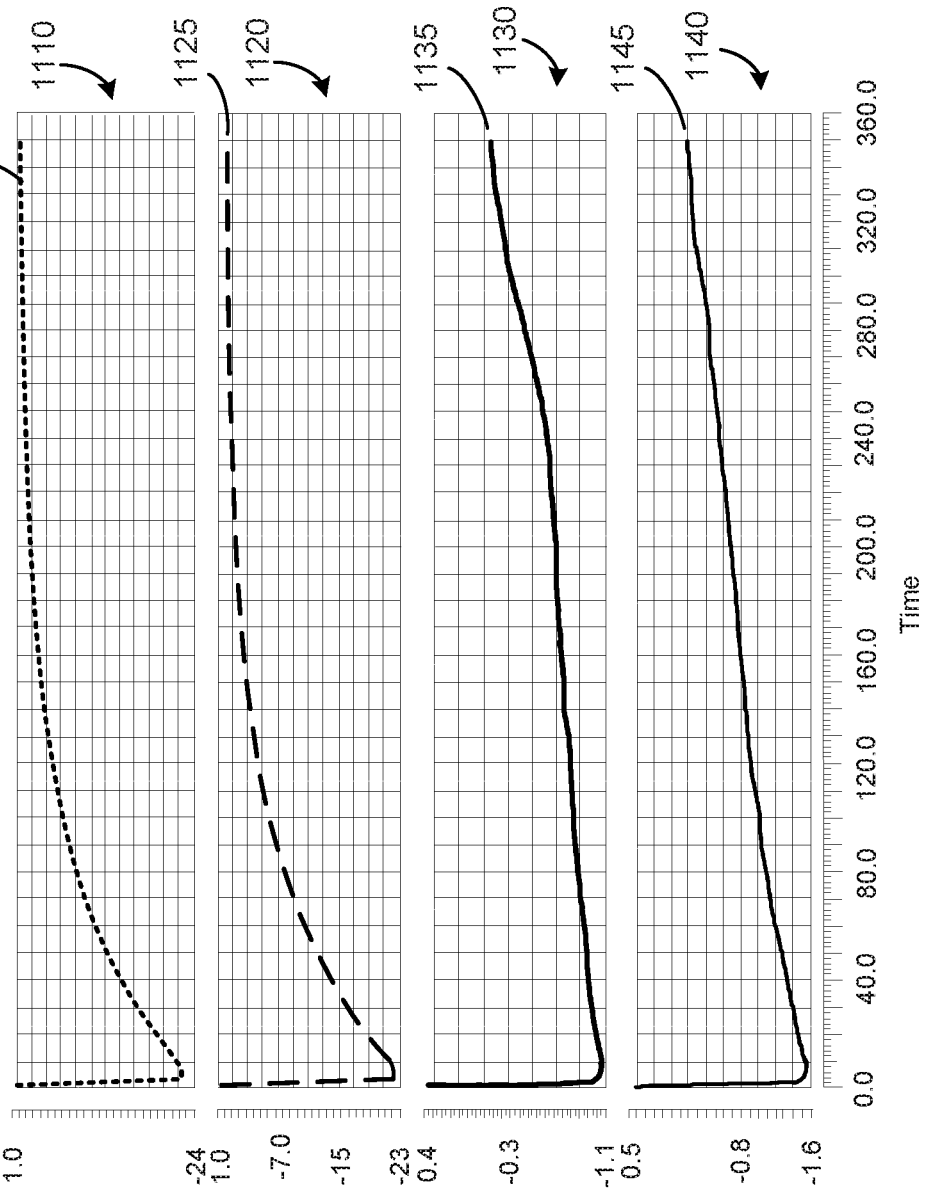

NEGATIVE VOLTAGE DETECTION AND VOLTAGE SURGE PROTECTION

TECHNICAL FIELD

This description relates to circuits for detecting negative voltages. More specifically, this disclosure relates to circuits that can be used to protect electronic devices (e.g., systems, other circuits, etc.) from negative voltages, while also being tolerant to positive and negative voltage surges.

BACKGROUND

Electrical devices and systems, such as consumer electronic devices, can be susceptible to damage from variations in voltages that are applied to such devices and systems. For instance, in certain situations, applying a negative voltage to a signal terminal of a device (e.g., data terminal, etc.) can cause damage to the circuitry of that device. A detection circuit can be used to detect such negative voltages and indicate (e.g., via an interrupt signal) the occurrence, or detection of a negative voltage. Protective measures can then be taken in response to such an interrupt signal to protect the device from damage that may be caused by the negative voltage.

Current implementations of circuits for detecting negative voltage have drawbacks, however. For instance, current implementations of such detection circuits may not be tolerant to positive and negative voltage variations that can occur on signal terminals for which negative voltage detection is being performed. Such voltage variations can result in damage to the detection circuit and/or a device the detection circuit has been implemented to protect. Current implementations of such detection circuits can also have unwanted static power consumption, e.g., when negative voltages are not present on signal terminals that are being monitored for negative voltages by such detection circuits.

SUMMARY

In a general aspect, a circuit can include a reference current generator configured to generate a first current signal representative of a threshold voltage. The circuit can also include a current comparator configured to mirror the first current signal, generate a second current signal representative of a received voltage and compare the second current signal to the first current signal. The current comparator can also be configured to provide a detection signal at a first logic value to indicate that the received voltage is below the threshold voltage when the comparison of the second current signal with the first current signal indicates that the received voltage is less than the threshold voltage.

In another general aspect, a circuit can include a first current comparator configured to generate an enable signal based on a comparison of a first current signal representative of a received voltage and a second current signal representative of a first threshold voltage. The circuit can also include a reference current generator configured to, in response to the enable signal, generate a third current signal representative of a second threshold voltage, the second threshold voltage being less than the first threshold voltage. The circuit can further include a second current comparator configured to mirror the third current signal and compare the third current signal to the first current signal. The second current comparator can also be configured to provide a detection signal at a first logic value to indicate that the received voltage is below the second threshold voltage when the comparison of the third current signal with the first current signal indicates that the received voltage is less than the second threshold voltage.

In another general aspect, a method of operating a circuit can include generating, by a current generator, a first current signal representative of a threshold voltage, mirroring, by a current comparator, the first current signal, generating, by the current comparator, a second current signal representative of a received voltage, and comparing, by the current comparator, the second current signal to the first current signal. The method can also include providing, by the current comparator, a detection signal at a first logic value to indicate that the received voltage is below the threshold voltage when the comparing of the second current signal with the first current signal indicates that the received voltage is less than the threshold voltage.

BRIEF DESCRIPTION OF THE DRAWINGS

FIGS. 7A-7C are graphs illustrating simulation results showing negative voltage detection and hysteresis of the circuit of FIGS. 1A and 2-6.

FIGS. 9A-9E are graphs illustrating simulation results showing operation of the circuit of FIGS. 1A and 2-6 across a range of voltages.

FIGS. 10A-10D are graphs illustrating simulation results showing operation of the circuit of FIGS. 1A and 2-6 in response to a positive voltage surge.

FIGS. 11A-11D are graphs illustrating simulation results showing operation of the circuit of FIGS. 1A and 2-6 in response to a negative voltage surge.

Like reference symbols in the various drawings indicate like and/or similar elements.

DETAILED DESCRIPTION

Figure 1A:
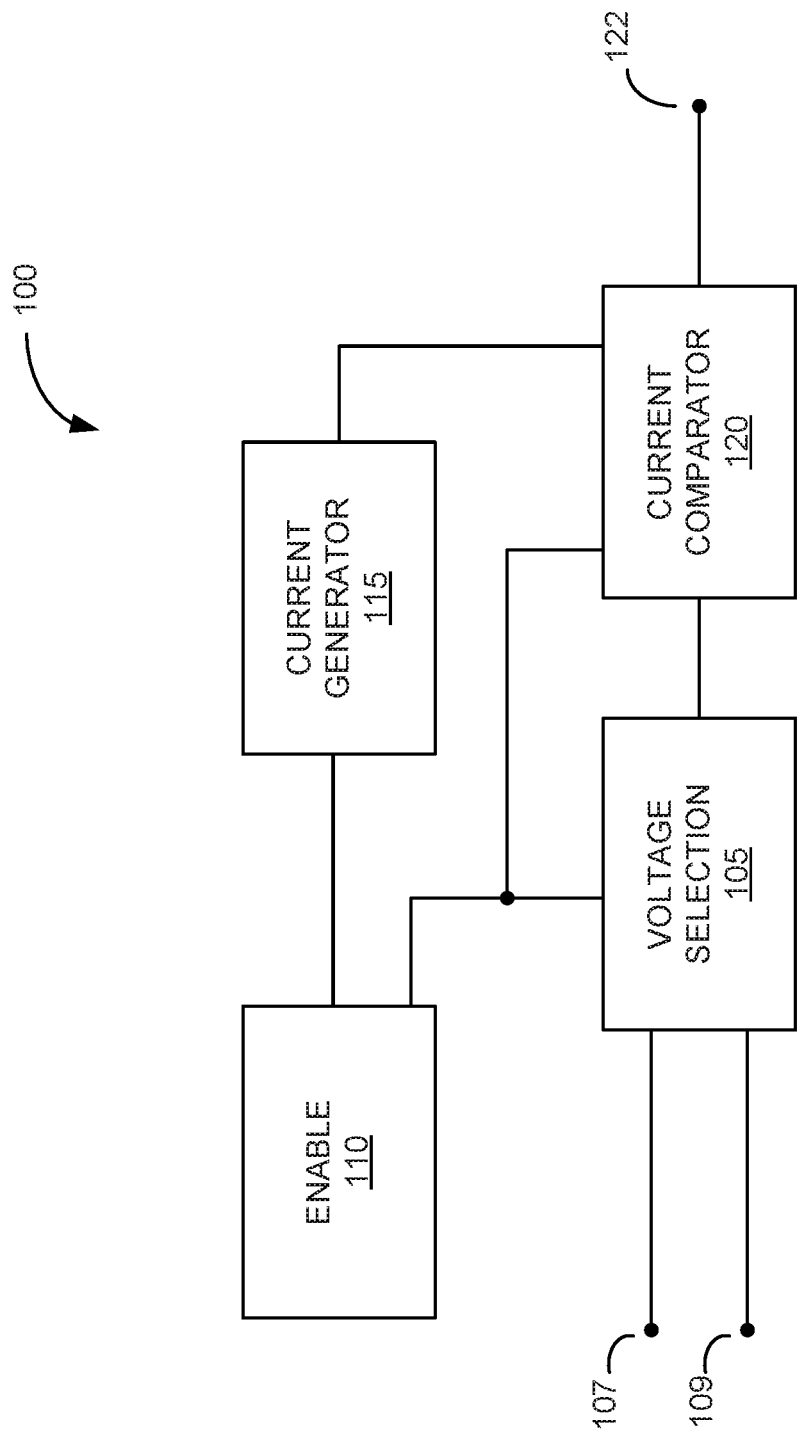
FIG. 1A is a block diagram illustrating a circuit in which a current comparator is implemented for negative voltage detection.

This disclosure relates to approaches, e.g., circuits and associated methods, for detecting negative voltages. Such circuits and methods can be implemented in a number of electronic devices and systems, which can be collectively referred to as devices. For example, the implementations described herein can be implemented in a Universal Serial Bus (USB) switch to detect negative voltages on common signal pins, such as data pins (DP/DM) on a common, e.g., host side, port of a USB switch.

In certain implementations, when an undesired negative voltage is detected using the implementations disclosed herein, an interrupt signal indicating the occurrence, or detection of the negative voltage can be sent to an associated device, such as a controller or processor of a USB switch, on which the negative voltage has been detected. In response to this interrupt signal, the device can take an appropriate action to protect the device and/or devices that are connected to the device on which the negative voltage was detected. For example, in USB switch implementations, a controller or processor of the USB switch can receive the interrupt signal and, in response to the interrupt signal, can disable the switch's common port to prevent the detected negative voltage from being communicated to a device (e.g., a computer, tablet, etc.) connected with the common port, which can prevent damage to the switch and/or any connected device.

While this disclosure specifically refers to approaches for negative voltage detection in the context of a USB switch, these approaches can also be implemented in other devices to detect negative voltages, and provide corresponding indications of such detection so appropriate actions can be take to protect the device on which the negative voltage is detected, as well as any operationally connected devices that could be adversely affected by such negative voltages.

In certain implementations, such as USB switches, a negative voltage detection circuit, such as those described herein, can be used to detect negative voltages on signal terminals that can also be subjected a wide range of direct-current (DC) voltages and/or to DC voltage surges. For example, in certain implementations, USB switches can be specified, rated at, etc., as being tolerant of ±24 volts (V) DC on their common data pins, such DP and DM data pins of the common USB port to which other USB ports of the switch are switched. Further, in some implementations, USB switches can be specified as being tolerant of ±24V DC voltage surges on the common data pins. The negative voltage detection circuit implementations that are disclosed and described herein are capable of detecting negative voltages (e.g., −1 V) on a signal terminal, such as a common data pin, and providing a signal indicating detection of a negative voltage, while being tolerant of the voltage ranges and voltage surges noted above without damage to the elements of the negative voltage detect circuit occurring.

Further, the implementations of negative voltage detection circuits described herein can operate with very low (e.g., at, or near zero) static power consumption during typical operation, e.g., when a negative voltage is not detected and no voltage surge is present. Also, as described herein, such negative voltage detection circuits can be implemented with hysteresis when detecting negative voltages, which can prevent oscillation of an associated detection, or interrupt signal. For instance, detection hysteresis in the hundreds of millivolts (mV) range can be implemented to prevent such oscillation.

FIG. 1A is a block diagram illustrating a circuit 100 in which a current comparator is used for negative voltage detection. As shown in FIG. 1A, the circuit 100 includes a voltage selection block 105, an enable block 110, a current generator block 115, and a current comparator block 120. In the circuit 100, the voltage selection block 105 can be configured to a select a lower voltage (e.g., which can be referred to as a most negative voltage) from a supply voltage VCC, which can be a supply voltage for the elements of the circuit 100 that can be provided on terminal 107, and a voltage VCOM that is applied on a signal terminal 109, where the circuit 100 is configured to monitor a voltage on the signal terminal 109, such as a common data pin, DP or DM, of a USB switch, and to detect whether that selected voltage is below a negative voltage detection threshold. In an example implementation, the circuit 100 can be configured to detect a negative voltage of −1.0 V. For purposes of discussion and illustration, this example implementation will be referenced in the following discussion. In certain implementations, other voltage levels, negative or otherwise, can be detected using the approaches described herein.

As shown in FIG. 1A, in the circuit 100, the voltage selector block 105 is coupled with the enable block 110. In the example above, where the circuit 100 is configured to detect a negative voltage of −1 V, the enable block 110 may be configured to generate an enable signal. The enable signal can be generated when a voltage supplied and/or selected by the voltage selection block 105 (e.g., a most negative voltage) to the enable block 110 is below an enable threshold voltage, where the enable threshold voltage is greater than, or more positive than the negative voltage detection threshold, such as −1 V in this example. For instance, the enable threshold voltage in this example could be −0.9 V. That is, if the voltage provided by, or selected by the voltage selection block 105, e.g., as a most negative voltage, is less than or equal to −0.9 V, the enable block 110 can be configured to generate an enable signal (which can be a logic "1" enable signal or a logic "0" enable # signal) that is provided to the current generator block 115 and the current comparator block 120 to enable, turn on, etc., those blocks. The current generator block 115 and the current comparator block 120 can, in turn, be configured to detect if the voltage provided by the voltage selection block 105 falls below the negative voltage detection threshold of −1 V.

In some implementations, if, prior to, or subsequent to the circuit 100 detecting a negative voltage that is less than or equal to the negative voltage detection threshold, the voltage selected and provided by the voltage selection block 105 increases above the enable threshold, the enable block 110 can change, or switch the enable signal from logic "1" to logic "0", or vice versa for an enable # signal, which can disable the current generator block 115 and the current comparator block 120. Further, in some implementations, the enable threshold for the enable block 110, either before or after detecting a negative voltage that is less than or equal to the negative voltage detection threshold, can be set at a higher, e.g., less negative voltage than noted above, such as at −0.6V, for example, so as to allow for hysteresis to be implemented for negative voltage detection, such as described herein.

In the circuit 100, the current generator block 115, when enabled by the enable block 110, can generate a reference current that corresponds with the negative voltage detect threshold, e.g., −1 V in this example. The current comparator 120 can be configured to mirror the reference current that is generated by the current generator block 115, and also configured to compare that mirrored current to a current representative of, corresponding with, etc., the voltage (e.g., a most negative voltage) selected and provided to the current comparator block 120 by the voltage selection block 105.

In the circuit 100, if the voltage provided to the current comparator 120 by the voltage selection block 105 becomes equal to, or less than the negative voltage detection threshold, the current comparator 120 can provide a signal, on the signal terminal 122, indicating that a negative voltage that is less than or equal to the negative voltage detect threshold has been detected. That signal, on signal terminal 122, can be provided, e.g., as an interrupt signal, to a controller of a device on which the negative voltage was detected and/or to one or more devices that are coupled with the device on which the negative voltage was detected. In response to the signal that indicates detection of a negative voltage, one or more actions can be taken to protect devices, and/or circuitry that could be adversely affected by, e.g., damaged by that negative voltage, such as opening a switch, powering off a circuit or device, etc.

In some implementations, the negative voltage detection threshold and the corresponding reference current can be a first negative voltage detection threshold and a first reference current. In such implementations, in response to the signal indicating detection of a negative voltage, based on the first negative voltage detection threshold, the current comparator 122 can be configured to generate a second reference current representative of a second negative voltage detection threshold that is greater than, e.g., less negative than the first negative voltage detection threshold. For instance, continuing from the example above, the second negative voltage detection threshold could be −0.7 V, which would result in negative voltage detection being performed with 300 mV of hysteresis, e.g., with the first negative voltage detection threshold being −1.0 V and the second negative voltage detection threshold being −0.7 V in this example.

In such approaches, the enable block 100 can be configured such that the enable threshold is at a voltage that is less negative than the second negative voltage detection threshold, at least when the current generator is generating the second reference current. Such an approach can prevent the enable block 110 from disabling the current generator block 115 and the current comparator block 120 when the voltage provided by the voltage selection block 105 is within the hysteresis voltage range, e.g., in a voltage range between the first negative voltage detection threshold and the second negative voltage detection threshold.

Figure 1B:
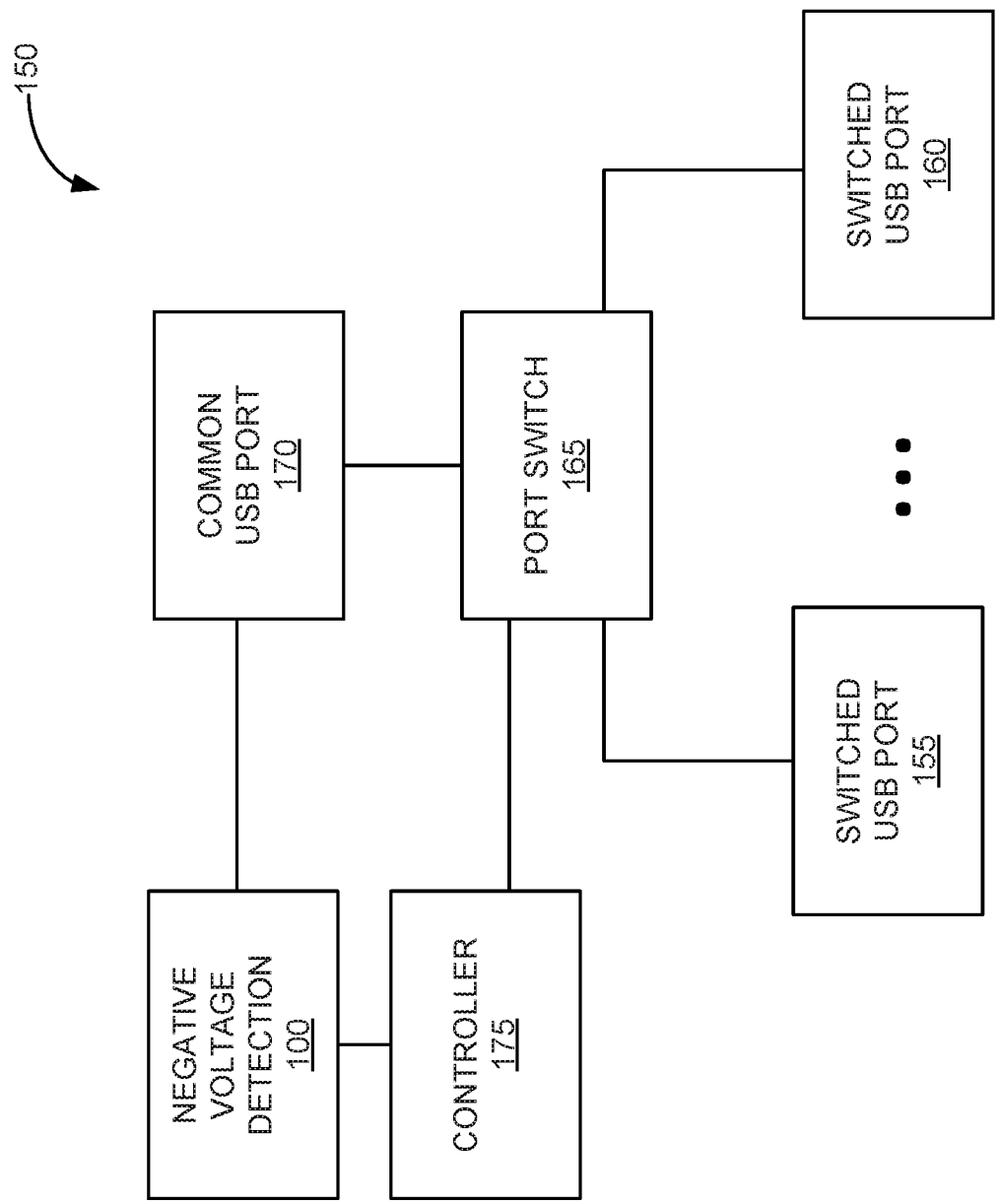
FIG. 1B is a block diagram illustrating a switch that includes the negative voltage detection circuit of FIG. 1A.

FIG. 1B is a block diagram illustrating a USB switch 150 that includes the negative voltage detection circuit 100 of FIG. 1A. As shown in FIG. 1B, the switch 150 can include a plurality of switched USB ports 155 to 160. Though only two switched USB ports are shown, as indicated in FIG. 1B, the switch 150 can include additional switched USB ports. The switch 150 also includes a port switch 165, a common USB port 170 and a controller 175. The controller 175 can be configured, based on operation of USB devices that are connected with the switched USB ports 155 to 160, to operate the port switch 165 to change which of those USB devices is coupled with the common USB port 170. Accordingly, the switch 150 can allow for a plurality of USB devices that are connected to the switched USB ports 155 to 160 to communicate with a host device that is coupled to the switch 150 via the common USB port 170.

As shown in FIG. 1B, the switch 150 can include the negative voltage detection circuit 100, which can be coupled with the common USB port 170 and the controller 175. In some implementations, the negative voltage detection circuit 100 can be connected to detect negative voltages on signal terminals of the common USB port 170, e.g., data pins DP and/or DM of the common USB port 170. In some implementations, the switch 150 can include multiple instances of the negative voltage detection circuit 100 for each signal terminal that is being monitored for the occurrence of negative voltages.

In the switch 150, in response to detecting a negative voltage that is less than or equal to a negative voltage detection threshold of the switch 150, the negative voltage detection circuit 100 can provide a signal, such as an interrupt signal, to the controller 175 that indicates the detection of the negative voltage. In response to receiving the signal indicating the detection of the negative voltage, the controller 175 can take one or more actions to prevent adverse effects from the detected negative voltage. Such actions can include, for example, directing the port switch 165 to disconnect all of the switched USB ports 155 to 160 from the common USB port 170, which can prevent the detected negative voltage from being communicated to a device, e.g., a host computing device, that is coupled with the common USB port 170, and prevent any potential resulting damage.

FIGS. 2-6 are schematic diagrams illustrating a circuit 200, which can implement the negative voltage detection circuit 100 of FIG. 1A. In each of FIGS. 2-6, the circuit 200 is shown with a respective block of the circuit 200 specifically indicated, which include implementations of the blocks of the negative voltage detection circuit 100 shown in FIG. 1A, e.g., a voltage selection block in FIG. 2, an enable block in FIG. 3, a reference current generator block in FIG. 4, and a current comparator block in FIG. 5. In addition to the implementations of the blocks of the circuit 100 of FIG. 1 that are indicated and described with respect to FIGS. 2-5, FIG. 6 illustrates the circuit 200 with a voltage clamping block indicated. While the respective discussion for each of FIGS. 2-6 is directed to the specific block indicated for the corresponding figure, reference numbers and elements of other blocks are referenced in the various descriptions, as appropriate.

Figure 2:
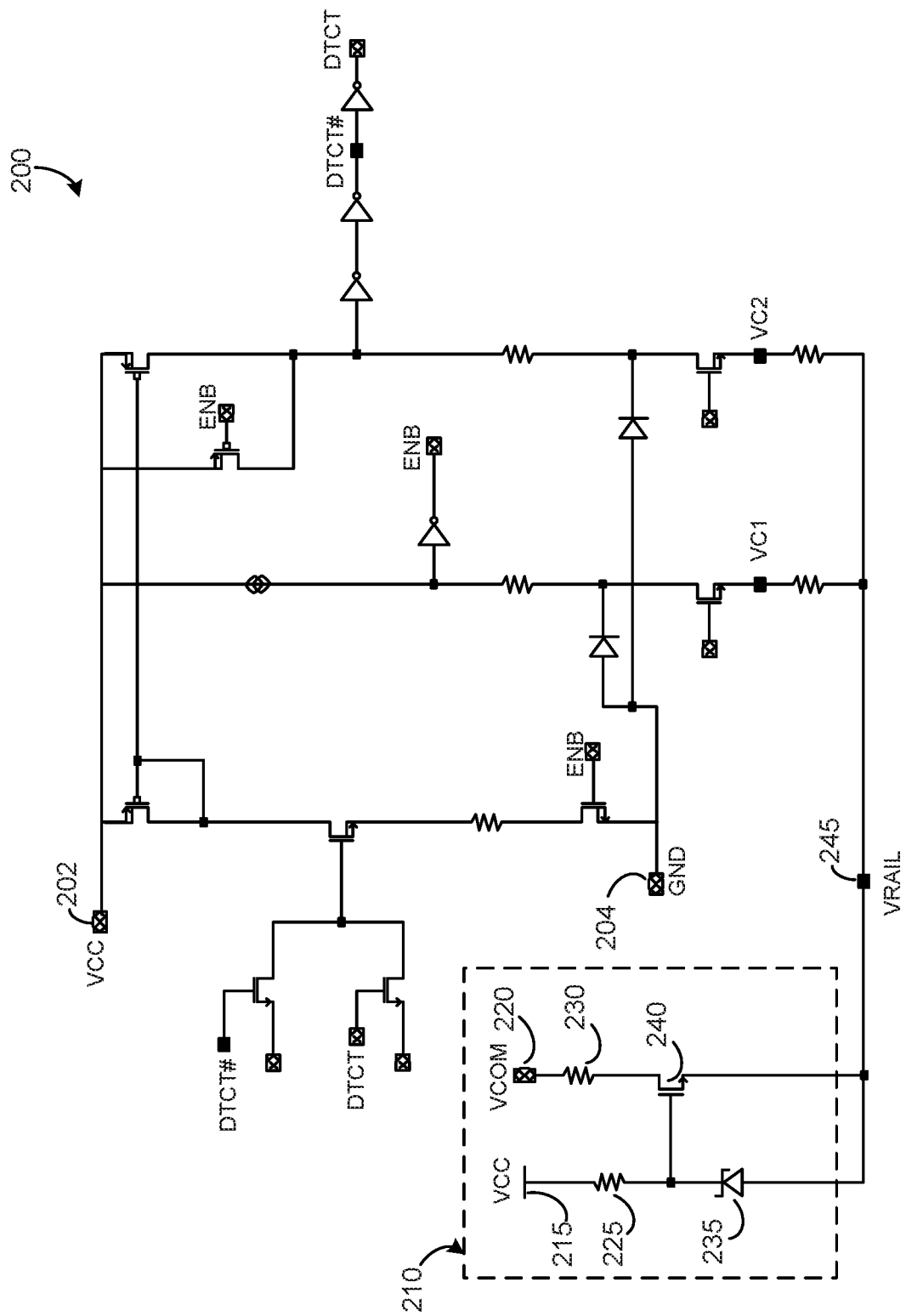
FIG. 2 is a schematic diagram of illustrating an implementation of the negative voltage detection circuit of FIG. 1A with a voltage selection block being identified.

FIG. 2 is a schematic diagram illustrating the circuit 200 with a voltage selection block 210 being identified. As discussed below, and further with respect to the simulation results illustrated in FIGS. 9A-11D, the voltage selection block 210 of the circuit 200 can also provide high voltage protection against voltages above a supply voltage for a device, such as the switch 150, in which the circuit 200 is implemented.

As shown in FIG. 2, the voltage selection block 210 can include a terminal 215 on which a supply voltage VCC can be applied, and a terminal 220 on which a voltage VCOM from a signal terminal that is being monitored for negative voltages is applied, such as a common data pin (e.g., DP or DM) of the common port 170 in the USB switch 150 of FIG. 1B. The voltage selection block 210 of the circuit 200 can also include a resistor 225, which can operate as a supply current (ICC) limiting resistor, and a resistor 230, which can operate as an electrostatic discharge (ESD) protection resistor, to help protect the circuit 200 from large voltage transients on, at least, the terminal 220. The voltage selection block 210 of FIG. 2 also includes a Zener diode 235 and a high-voltage n-type metal-oxide semiconductor (NMOS) transistor 240.

As discussed above with respect to the voltage selection block 105 of the circuit 100, the voltage selection block 210 of the circuit 200 can be configured to select a lower voltage, e.g., a most negative voltage, between VCC applied on terminal 215 and VCOM applied on terminal 220, and provide that selected voltage on the terminal 245 as a voltage VRAIL, as is indicated in FIG. 2. For instance, when VCOM is less than VCC, the NMOS transistor 240 will operate in its linear mode, and VCOM will be, with some voltage drop through the resistor 230, applied to the terminal 245 as VRAIL.

However, when VCOM is greater than VCC, because the Zener diode 235 the NMOS transistor 240 will clamp the VRAIL terminal 245 to approximately VCC minus a threshold voltage of the NMOS transistor 240, preventing high voltages, e.g., of up to 24 V DC in the example discussed above, from being applied to the other blocks, such as the enable block and the current comparator block, of the circuit 200. The Zener diode 235 can clamp a gate-to-source voltage of NMOS transistor 240, to protect the gate of the NMOS transistor 240 from damage. In some implementations, other approaches can be used to clamp the gate-to-source voltage of the NMOS transistor 240. For example, a plurality of series connected PN diodes, or other voltage clamping circuit, could be used in place of the Zener diode 235.

As the circuit 200 is configured to detect when VCOM is less than or equal to a negative voltage threshold, clamping VRAIL to VCC when VCOM exceeds VCC, which, in implementations, can be in a range of 2.5 V to 5 V, does not inhibit the circuit 200 from detecting such negative voltages and also can protect the circuit 200, and any connected devices, from such high VCOM voltages.

Figure 3:
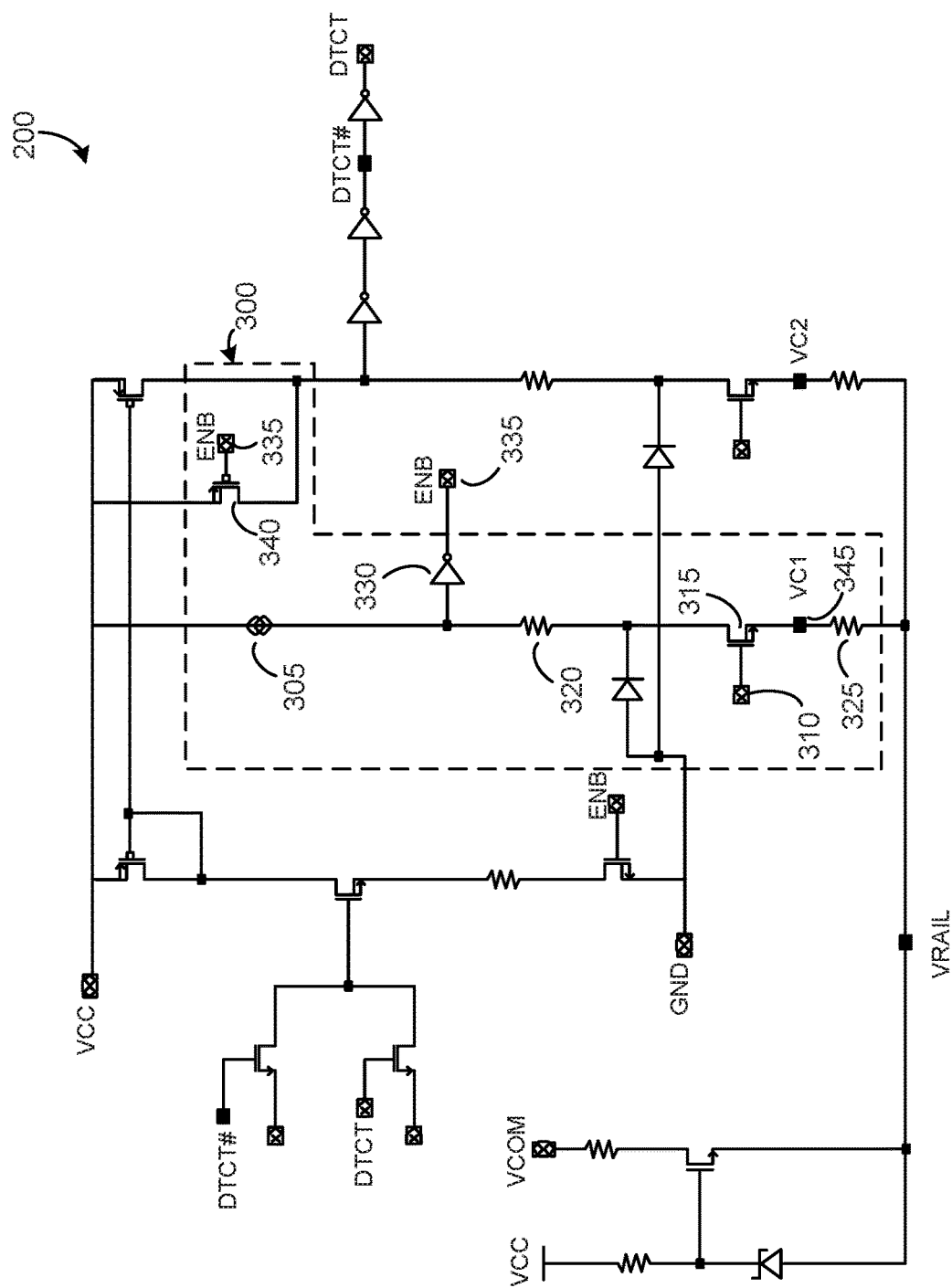
FIG. 3 is a schematic diagram of the circuit of FIG. 2 with an enable block being identified.

FIG. 3 is a schematic diagram of the circuit 200 of FIG. 2 with an enable block 300 being identified. As shown in FIG. 3, the enable block 300 includes a current source 305, such as a pull-up resistor, a terminal 310 for providing a voltage that corresponds with a threshold voltage of the enable block 300, which can be referred to as an enable threshold, and an NMOS transistor 315 that is configured to receive the voltage representative of the enable threshold voltage on its gate terminal. In some implementations, a voltage applied on the terminal 310 can be determined based on a normal operation point, such as VCOM being greater than zero, and a given negative threshold voltage. For instance, to reduce power dissipation during normal operation, e.g., when VCOM is greater than 0V, the voltage applied on the terminal 310 can be selected to ensure that the NMOS transistor 315 is turned off during normal operation. Further, the voltage applied on the terminal 310 can be selected to ensure that the enable block provides a logic 1 enable signal to enable the current reference generator block of FIG. 4 and the current comparator block 500 of FIG. 5 when and the Also need when VCOM is less than a second negative voltage detection threshold, e.g., a hysteresis threshold. In other words, the voltage applied on the terminal 310 should be selected such that the NMOS transistor is off during normal operation, and such that the NMOS transistor 315 is on when VCOM is less that or equal to the hysteresis threshold.

The enable block 300 also includes resistors 320 and 325 that can regulate a pull-down current of the enable block 300, e.g., from VRAIL. In some implementations the resistor 320 can be omitted.

When the gate-to-source voltage of the NMOS transistor 315 applied across the gate terminal 310 of the NMOS transistor 315 and the VRAIL terminal 245 is greater than a threshold voltage of the transistor 315 (e.g., when VCOM becomes negative enough and reaches the enable threshold voltage), the transistor 315 will turn on, causing an input terminal of inverter 330 of the enable block 300 to change to logic low, causing the enable signal ENB on an output terminal 335 of the inverter 330 to change to logic high, which as discussed herein, will enable the reference current generator block and current comparator block of the circuit 200.

Conversely, when the gate-to-source voltage of the NMOS transistor 315 is less than a threshold voltage of the transistor 315 (e.g., when VCOM becomes positive enough and is more positive than the enable threshold voltage), the transistor 315 will turn off, causing an input terminal of inverter 330 of the enable block 300 to change to logic high, causing the enable signal ENB on an output terminal 335 of the inverter 330 to change to logic low, which as discussed herein, will disable the reference current generator block and current comparator block of the circuit 200.

As shown in FIG. 3, the signal ENB on the terminal 335 can be applied to a gate terminal of a p-type metal-oxide semiconductor (PMOS) transistor 340 of the enable bock 335. When the signal ENB changes to logic high, the PMOS transistor 340 will turn off, causing VCC to no longer be applied to a pull-up side of a current comparator block of the circuit 200. Blocking VCC from being applied to the pull-up side of the current comparator block enables the current comparator block to, in conjunction with a reference current generator block, detect negative voltages, as described herein, such as with respect to, at least, FIGS. 4 and 5.

As is also shown in FIG. 3, the enable block 300 includes a terminal 345 on which a voltage VC1 is present. In certain situations, e.g., for negative VCOM voltages, VC1 can be clamped using, for example, a voltage clamp block that is indicated in the schematic of the circuit 200 shown in FIG. 6, and is described below. The diode shown within the enable block 300 in FIG. 3 is part of that voltage clamp block and, therefore, is not described with respect to FIG. 3, but instead is described with respect to FIG. 6.

Figure 4:
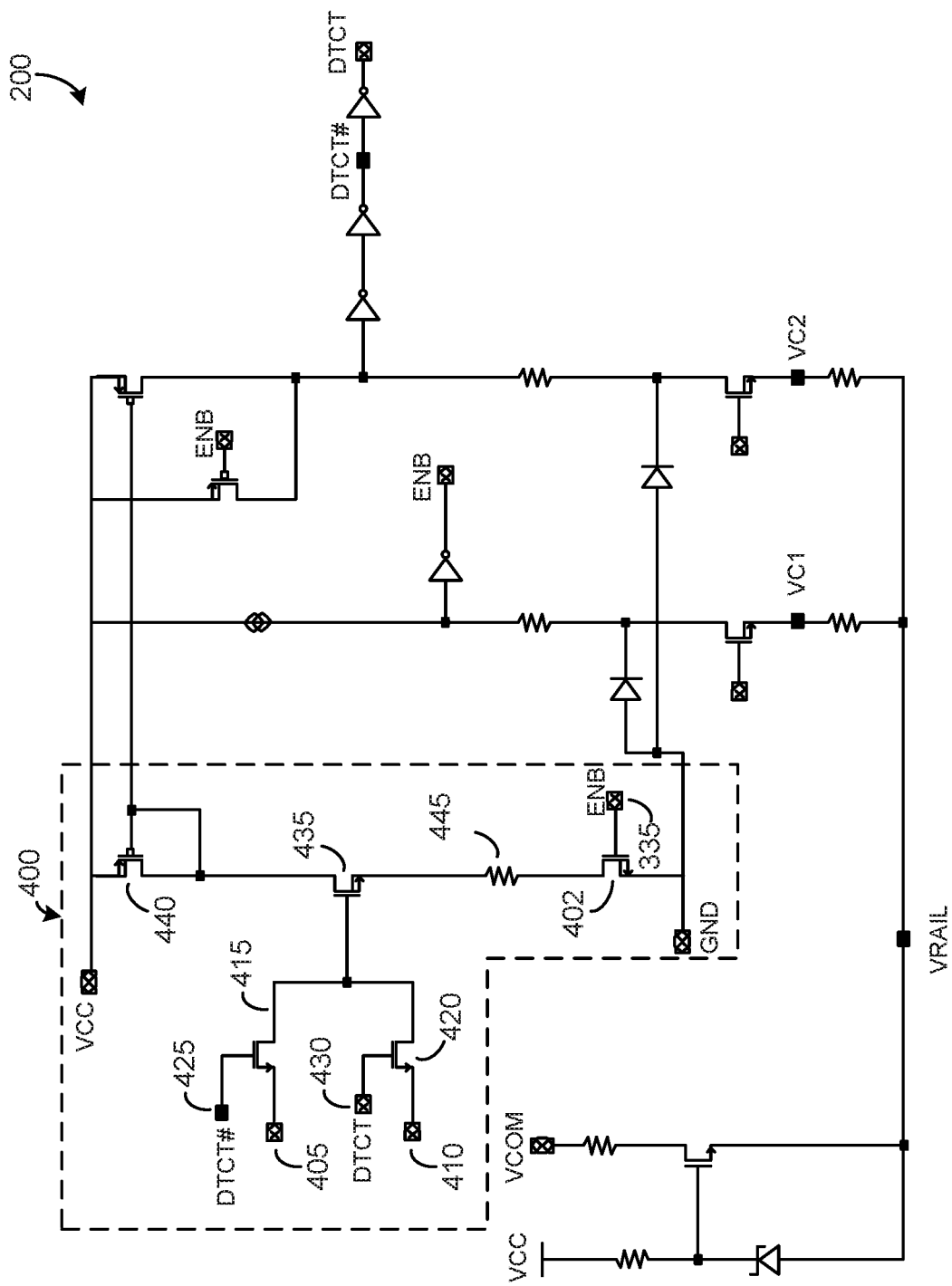
FIG. 4 is a schematic diagram of the circuit of FIG. 2 with a reference current generator block being identified.

FIG. 4 is a schematic diagram of the circuit 200 of FIG. 2 with a reference current generator block 400 being identified. As shown in FIG. 4, the reference current generator block 400 can include an NMOS transistor 402 that has its gate terminal coupled the terminal 335 on which the enable signal ENB is communicated from the enable block 300 of FIG. 3. Accordingly, when the signal ENB is logic high, the NMOS transistor 402 is on, which enables the reference current generator block 400 of the circuit 200 to generate reference currents for negative voltage detection. When the signal ENB is low, the transistor 402 is off and the reference current generator block 400 has zero, or near zero static power dissipation, as no reference current is generated.

The reference current generator block 400 of the circuit 200, as shown in FIG. 4, includes a terminal 405 on which a voltage representative of a first negative voltage detection threshold can be applied to a source terminal of an NMOS transistor 415. Continuing with the example above, the voltage applied to the terminal 405 may correspond with a first negative voltage detection threshold of −1 V (though, in certain implementations, the voltage applied to the terminal 405 may vary from the first negative voltage detection threshold, such as based on other voltages applied in the circuit 200, thresholds of other transistors, etc.).

Figure 5:
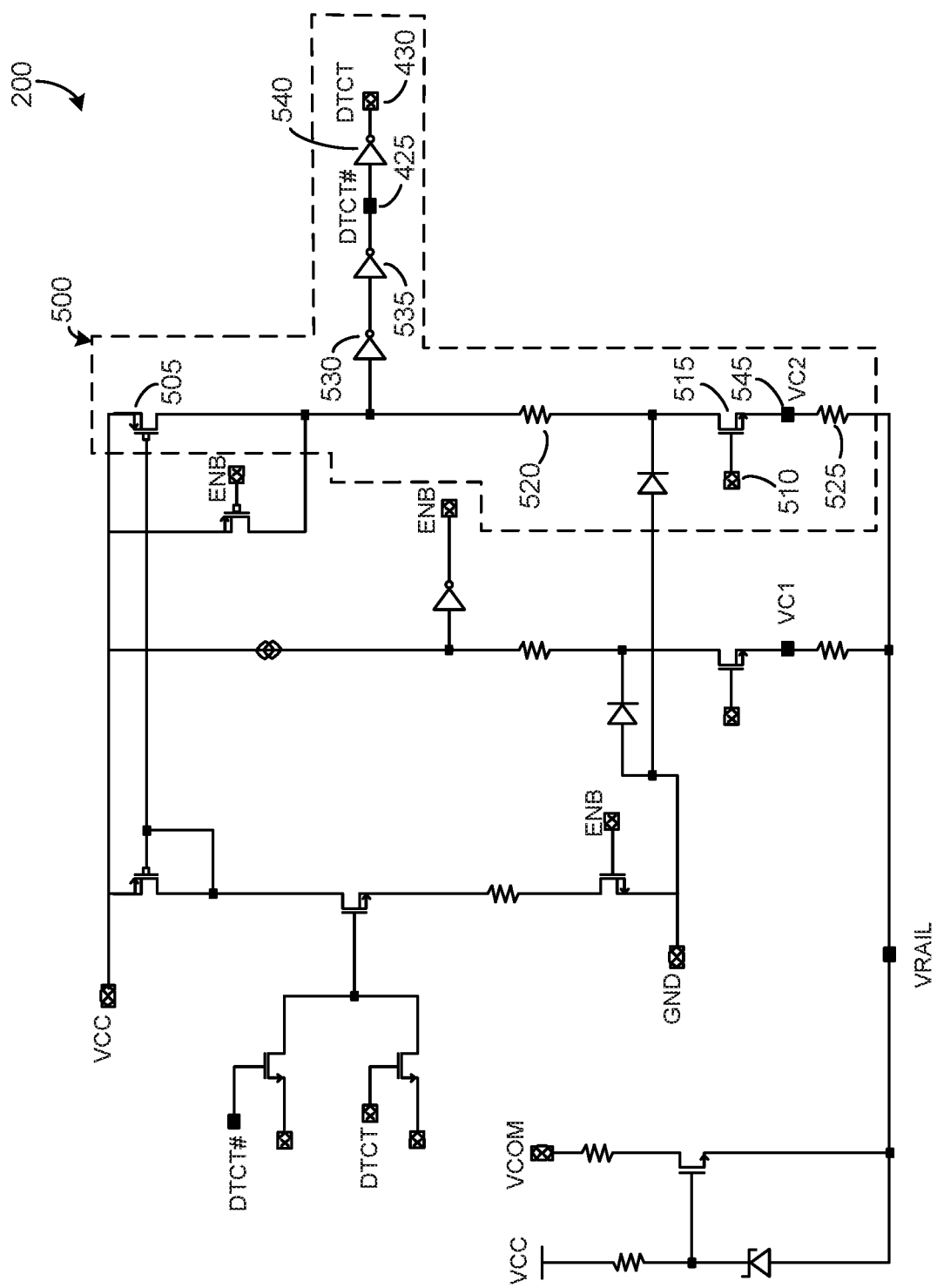
FIG. 5 is a schematic diagram of the circuit of FIG. 2 with a current comparator block being identified.

As shown in FIG. 4, the gate terminal of the NMOS transistor 415 is coupled with a terminal 425, on which a signal DTCT # can be applied, where DTCT # is a signal generated by a current comparator (as indicated in FIG. 5) of the circuit 200 that, when DTCT # is logic high, indicates a negative voltage, e.g., a VRAIL voltage, equal to or less than the first negative voltage detection threshold has not been, or is currently not being detected by the circuit 200. In this situation, the voltage on terminal 405 representative of a first negative voltage detection threshold would be communicated through the transistor 415. When DTCT # changes to logic low, indicating a negative voltage equal to or less than the first negative voltage detection threshold has been detected, the transistor 415 will turn off, blocking the voltage on the terminal 405 from being communicated through the transistor 415.

In cooperation with the terminal 405, the transistor 415 and the DTCT # signal on the terminal 425, the reference current generator block 400 also includes a terminal 410 on which a voltage representative of a second negative voltage detection threshold (e.g., a hysteresis negative voltage detection threshold) can be applied to a source terminal of an NMOS transistor 425. Continuing with the example above, the voltage applied to the terminal 410 may correspond with a second negative voltage detection threshold of −0.7 V to implement hysteresis for negative voltage detection, though, in certain implementations, the voltage applied to the terminal 410 may vary from the second negative voltage detection threshold based on other voltages applied in the circuit 200, thresholds of other transistors, etc.

The gate terminal of the NMOS transistor 420 is coupled with a terminal 430, on which a signal DTCT, which is inverse to the signal DTCT #, can be applied, where DTCT is generated by the current comparator indicated in FIG. 5. DTCT, when logic high, indicates a negative VRAIL voltage, equal to or less than the first negative voltage detection threshold, has been detected by the circuit 200. In this situation, the voltage on terminal 410 representative of the second (hysteresis) negative voltage detection threshold would be communicated through the transistor 420, while the voltage on the terminal 405 is blocked by the transistor 415.

When DTCT changes from logic high to logic low, this can indicate that a negative voltage equal to or less than the second (hysteresis) negative voltage detection threshold is no longer detected. In this situation, the transistor 420 will turn off, blocking the voltage on the terminal 410 from being communicated through the transistor 420. However, as noted above, the transistor 415 will then turn on in response to DTCT # changing from logic zero to logic 1. Using the DTCT and DTCT # signals, as described above, the reference current generator 410 can implement negative voltage detection with hysteresis by switching between generating a first reference current representative of a first negative voltage detection threshold and generating a second current representative of a second negative voltage detection threshold, such as a hysteresis threshold).

In the circuit 200, the reference current generator block 400 also includes a PMOS transistor 440 which provides a current source for the reference current generator block 400, where the generated reference current flows through an NMOS transistor 435, a resistor 445, and the NMOS transistor 402 that is used to enable the reference current generator block 400. When DTCT # is logic high, the reference current generated by the reference current generator block 400 can be determined by a difference between the voltage applied to the terminal 405, this representative of the first negative voltage detection threshold, and a threshold of the NMOS transistor 435 divided by a resistance of the resistor 445. When DTCT is logic high, the reference current generated by the reference current generator block 400 can be determined by a difference between the voltage applied to the terminal 410, this representative of the second, hysteresis, negative voltage detection threshold, and the threshold of the NMOS transistor 435 divided by a resistance of the resistor 445. An amount of hysteresis for negative voltage detection in the circuit 200 can be determined as a difference between the voltage applied to the terminal 405 and the voltage applied to the terminal 410.

FIG. 5 is a schematic diagram of the circuit of FIG. 2 with a current comparator block 500 being identified. As shown in FIG. 5, the current comparator block 500 includes PMOS transistor 505 that operates as a current mirror of the PMOS transistor 440 of the reference current generator block 400. That is, the PMOS transistor 505 can mirror a reference current generated by reference current generator block 400, e.g., when the current comparator block 500 and the reference current generator block 400 are enabled by the signal ENB of the enable block 300.

As shown in FIG. 5, the current comparator also includes a terminal 510 that is coupled with a gate of an NMOS transistor 515, a resistor 520 and a resistor 525. In some implementations, the resistor 520 can be omitted. A voltage applied to the terminal 510, along with the voltage that is used by the reference current generator block 400 to generate a reference current, determines the negative voltage detection threshold that is used by the current comparator block 500. In order to accurately detect negative voltages, or other voltages, using the circuit 200, the NMOS transistor 435 of the reference current generator block 400 and the NMOS transistor 515 of the current comparator should be closely matched in their operational parameters, dimensions, physical layout, etc. Also, in this example implementation, for accuracy of current comparison, the resistor 445 of the reference current generator block 400 and the resistor 525 of the current comparator should be closely matched in impedance dimensions, physical layout, etc.

In the current comparator block 500 of the circuit 200, if the pull-down current through the NMOS transistor 515 and the resistor 525 is greater than the pull-up current that is mirrored from the reference current generator block 400, the DTCT signal on the terminal 430 will change to logic high and the DTCT # signal on the terminal 425 will change to logic low, indicating a negative voltage that is less than or equal to a current negative voltage detection threshold (e.g., as represented by the pull-up current of the current comparator block 500, as mirrored by the PMOS transistor 505) has been detected by the circuit 200. Conversely, if the pull-down current through the NMOS transistor 515 and the resistor 525 is less than the pull-up current that is mirrored from the reference current generator block 400, the DTCT signal on the terminal 430 will change to logic low and the DTCT # signal on the terminal 425 will change to logic high, indicating a negative voltage that is less than or equal to a current negative voltage detection threshold (e.g., as represented by the pull-up current of the current comparator block 500, as mirrored by the PMOS transistor 505) has not been, or is no longer being detected by the circuit 200.

As is also shown in FIG. 5, the current comparator block 500 includes a terminal 545 on which a voltage VC2 is present. In certain situations, such as for negative VCOM voltages, VC2, along with VC1 in the enable block 300, can be clamped using, for example, a voltage clamp block that is indicated in the schematic of the circuit 200 shown in FIG. 6, and is described below. The diode shown within the current comparator block 500 in FIG. 5 is part of that voltage clamp block and, therefore, is not described with respect to FIG. 5, but instead is described with respect to FIG. 6.

Figure 6:
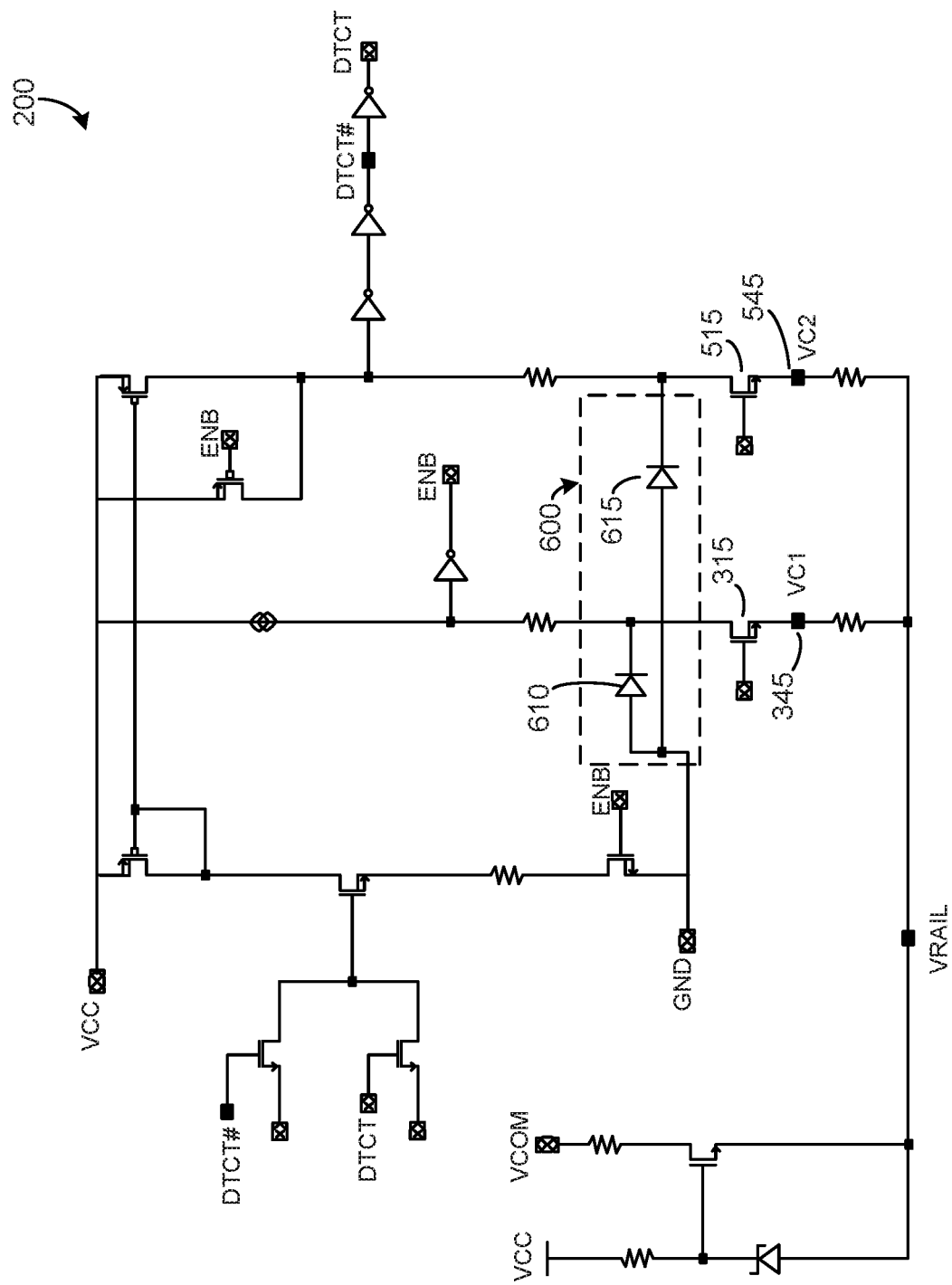
FIG. 6 is a schematic diagram of the circuit of FIG. 2 with a voltage clamp block being identified.

FIG. 6 is a schematic diagram of the circuit of FIG. 2 with a voltage clamp block 600 being identified. As shown in FIG. 6, the voltage clamp block 600 includes a first diode 610 and a second diode 615, which are coupled between electrical ground and respective drain terminals of the transistors 315 and 515. As shown in the simulation results of the circuit 200 of FIGS. 9A-11D, the diodes 610 and 615 operate, at negative VRAIL, and negative VCOM voltages, to respectively clamp the voltages of terminals 345 and 545 to protect the transistors 315 and 515, respectively, from such negative VRAIL and negative VCOM voltages. For instance, in some implementations, the diodes 610 and 615 can, respectively, clamp drain terminals of the transistors 315 and 515 to approximately a negative diode threshold, e.g., approximately −0.7 V.

FIGS. 7A-11D are graphs illustrating simulation results (e.g., voltages, currents and/or timing) for an implementation of the circuit 200 of FIGS. 2-6 across various operating conditions. Accordingly, the simulations results are discussed with further reference to those drawings. The values (e.g., voltage, current, time) shown in the simulation results of FIGS. 7A-11D can be actual or empirical values obtained from simulation of an implementation of the circuit 200 or, in some instances, can be normalized values. For instance, in certain implementations, the values shown in the simulation results of FIGS. 7A-11D can correspond with the previously discussed example, where a negative voltage detection circuit, such as the circuit 200, is implemented using a first negative voltage detection threshold of −1 V and a second negative detection threshold, for hysteresis, of −0.7 V. As also shown by the simulation results FIGS. 9A-11D, the circuit 200 of this example implementation is tolerant to voltages, e.g., VCOM voltages, of ±24 V DC, such as on, on data pins of a common port in USB switch, as well as being tolerant of ±24 V DC voltage, e.g., VCOM surges. For each of group of simulation result graphs in FIGS. 7A-11D, a common time scale that applies to each graph of a respective group is included with the bottom-most graph of each group.

FIGS. 7A-7C are graphs illustrating simulation results showing negative voltage detection and hysteresis of the circuit 200 of FIGS. 2-6. FIG. 7A is graph 710 including a trace 715 illustrating voltages for VCOM on which negative voltage detection is performed by the circuit 200, such as discussed above. FIG. 7B is a graph 720 including a trace 725 that shows the signal DTCT corresponding with negative voltage detection by the circuit 200 for the trace 715 of VCOM in FIG. 7A. FIG. 7C shows a supply current for the circuit 200 corresponding with the negative voltage detection of FIGS. 7A and 7B.

In FIGS. 7A-7C, reference voltages V1 and V2 representative of first and second negative voltage detect thresholds are shown. V1 and V2, which are illustrated with corresponding vertical lines through FIGS. 7A-7C, represent points in time when VCOM intersects those respective voltages, V1 and V2, in FIG. 7A. For instance, V1 indicates a point in time, on the time scale included in FIG. 7C, where the trace 715 of VCOM, changing from positive to negative, crosses (e.g., satisfies) a first negative detection threshold, e.g., −1 V in the foregoing example, and the circuit 200 indicates detection of a negative voltage by the signal DTCT of the trace 725 in FIG. 7B changing from logic low to logic high. V2 indicates a point in time, on the time scale included in FIG. 7C, where the trace 715 of VCOM, changing from negative to positive, crosses (e.g., satisfies) a second (hysteresis) negative detection threshold, e.g., −0.7 V in the foregoing example, and the circuit 200 indicates, with hysteresis, that a negative voltage is no longer detected by the signal DTCT of the trace 725 in FIG. 7B changing from logic high to logic low.

As shown by FIG. 7C, supply current for the circuit 200 is at, or near zero, except at the current peaks 740, 745, 750 and 755. The current peaks 740 and 745, in this example, correspond, respectively, with the enable block 300 being enabling and disabling the reference current generator 400 and the current comparator 500 of the circuit 200. The current peaks 750 and 755, in this example, correspond, respectively, with switching current for changing DTCT from low to high, at the peak 750, and from high to low, at the peak 755.

Figure 8A:
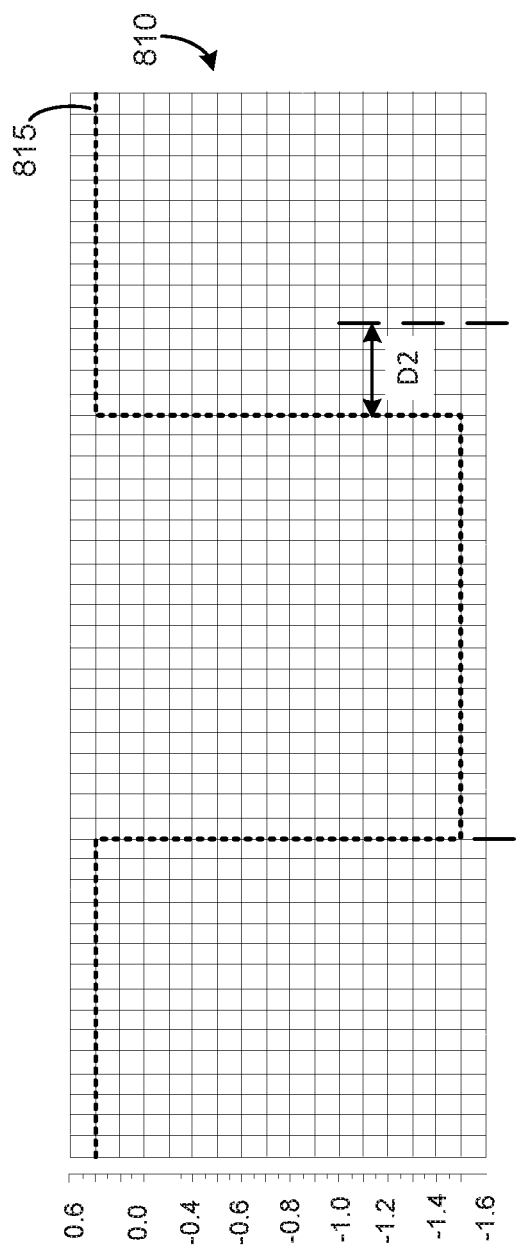
FIGS. 8A-8B are graphs illustrating simulation results showing negative voltage detection of the circuit of FIGS. 1A and 2-6.
Figure 8B:
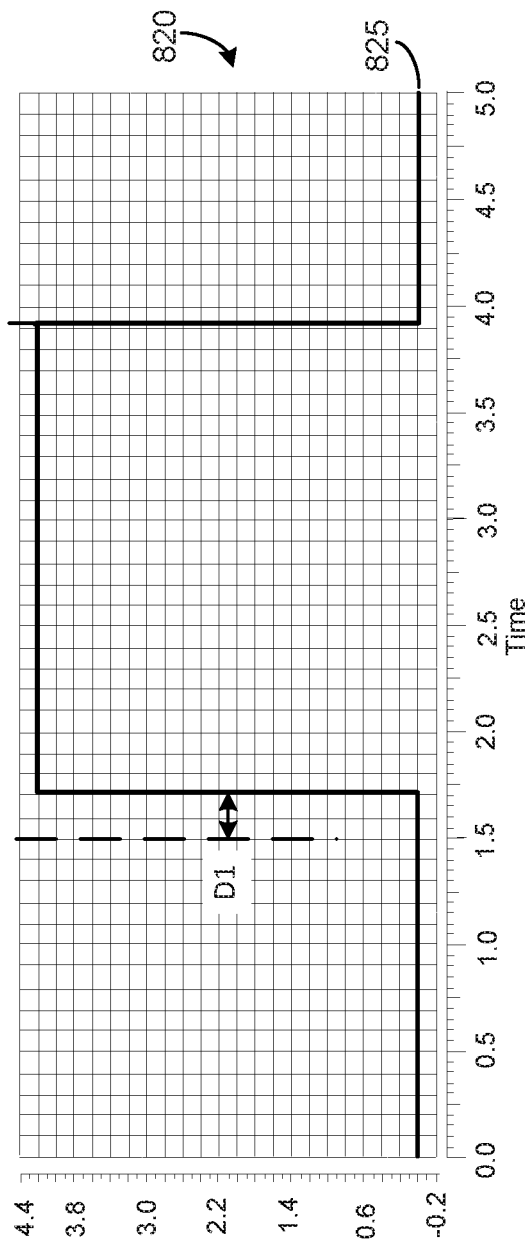

FIGS. 8A-8B are graphs 810 and 820 illustrating simulation results showing negative voltage detection of the circuit 200 of FIGS. 2-6. The simulation results in FIGS. 8A and 8B show signal traces for VCOM and DTCT, when detecting negative voltages at a much finer time scale, and with a much steeper vertical edge for VCOM, as compared to the time scale for FIGS. 7A-7C and the much shallower slope of VCOM in FIGS. 7A-7C.

Continuing with the previous example, for the simulation results of the circuit 200 in FIGS. 8A and 8B, the first negative voltage detection threshold is −1 V and the second (hysteresis) negative voltage detection threshold is −0.7 V. FIG. 8A includes a trace 815 showing VCOM, in an implementation of the circuit 200, starting at 0 V, switching to −1.5 V and then switching back to 0 V. 8B includes a trace 825 of the signal DTCT in the circuit 200, where the trace 825, when compared with the trace 815 in FIG. 8A, illustrates switching delay D1 in response to VCOM changing from 0 V to −1.5V. The trace 825 of the DTCT signal in FIG. 8B, when compared with the trace 815 in FIG. 8A, also illustrates switching delay D2 in response to VCOM changing from −1.5 V to 0V.

In the implementation of circuit 200 corresponding with the simulation results in FIGS. 8A and 8B, the time scale can be in microseconds (μs), while the time scale in FIG. 7A-7D can be milliseconds (ms). Accordingly, as shown in FIGS. 8A and 8B, the switching delay D1 can be approximately 0.2 μs, while the switching delay D2 can be approximately 0.4 μs.

FIGS. 9A-9E are graphs 910, 920, 930, 940 and 950 illustrating simulation results showing operation of the circuit 200 of FIGS. 2-6 across a range of voltages, e.g., a range of VCOM voltages. In the simulations of FIGS. 9A-9E, a supply voltage VCC of approximately 5 V is applied to the terminal 215 of the circuit 200 over the time period illustrated.

The graph 910 of FIG. 9A includes a trace 915 illustrating VCOM across a range of voltages, e.g., from approximately −24 V to +24 V, over a period of time. The graph 920 of FIG. 9B illustrates VRAIL in the circuit 200 across the range of VCOM shown in FIG. 9A. As shown in FIGS. 9A and 9B, VRAIL, when VCOM is approximately −24 V, VRAIL is also approximately −24 V. As VCOM increases, VRAIL rail also increases, e.g., in correspondence with VCOM, until VCOM becomes greater than VCC. As shown in FIGS. 9A and 9B, when VCOM exceeds VCC, VRAIL can be clamped by the voltage selection circuit 210 at approximately 5V, even when VCOM reaches approximately +24 V at the end of the illustrated time period.

The graphs 930 and 940 of the FIGS. 9C and 9D include, respectively, trace 935 illustrating VC1, and trace 940 illustrating VC2 in the circuit 200. As shown by FIGS. 9A, 9C and 9D, when VCOM is approximately −24 V, VC1 345 can be clamped by the diode 610 of the voltage clamping block 600 at approximately −1.1 V, while VC2 can be clamped by the diode 615 of the voltage clamping block 600 at approximately −1.6 V. As noted above, such clamping of VC1 and VC2 can prevent damage to the transistors 315 and 515 of the circuit 200 as a result of a large negative VCOM voltage (e.g., relative to a supply voltage of the circuit 200) being applied to the terminal 220 of the circuit 200, such as to a common data pin of a common USB port in a USB switch. As also shown by FIGS. 9A, 9C and 9D, once VCOM increases to the clamp voltages VC1 and VC2, those clamp voltages increase with VCOM, until VRAIL, as shown in FIG. 9B, is clamped at VCC, which also clamps VC1 and VC2 at approximately VCC.

The graph 950 of FIG. 9E includes a trace 955 illustrating a supply current of the circuit 200 across the range of VCOM illustrated in FIG. 9A. As shown in FIGS. 9A and 9E, there is supply current of approximately 0.3 milliamps in this example when VCOM is approximately −24 V, which is static current due to the voltage selection block 210, the reference current generator block 400 and the current comparator 500 being enabled. As VCOM increases (becomes less negative), the supply current decreases, as shown in FIGS. 9A and 9E, until a current spike 960 occurs, where the current spike 960 can be switching current resulting from the signal DTCT switching to from logic high to logic low, and switching current resulting from the reference current generator block 400 and the current comparator 500 being disabled by the enable block 300.

FIGS. 10A-10D are graphs 1010, 1020, 1030 and 1040 illustrating simulation results showing operation of the circuit 200 of FIGS. 2-6 in response to a positive voltage (VCOM) surge. The graph 1010 of FIG. 10A includes a trace 1015 that illustrates a voltage surge of VCOM from 0 V to approximately 24 V, that then exponentially decays back to zero. The graph 1020 of FIG. 10B includes a trace 1025 that illustrates VRAIL in response to the voltage surge of FIG. 10A. The graph 1030 of FIG. 10C includes a trace 1035 that illustrates VC1 in response to the voltage surge of FIG. 10A. The graph 1040 of FIG. 10D includes a trace 1045 that illustrates VC1 in response to the voltage surge of FIG. 10A. As shown by FIGS. 10A-10D, when VCOM surges from 0 V to 24 V, each of the voltages VRAIL, VC1 and VC2 increase until they are clamped at VCC by the voltage selection block 210, such as has been discussed above. As also shown by FIGS. 10A-10D, when VCOM exponentially decays from 24 V to 0 V, each of the voltages VRAIL, VC1 and VC2 remains clamped at VCC until VCOM decays to less than VCC. Once VCOM has decayed to less than VCC, the voltages VRAIL, VC1 and VC2 also decay in correspondence with VCOM.

FIGS. 11A-11D are graphs 1110, 1120, 1130 and 1140 illustrating simulation results showing operation of the circuit 200 of FIGS. 2-6 in response to a negative voltage (VCOM) surge. The graph 1110 of FIG. 11A includes a trace 1115 that illustrates a voltage surge of VCOM from 0 V to approximately −24 V, that then exponentially increases back to zero. The graph 1120 of FIG. 11B includes a trace 1125 that illustrates VRAIL in response to the voltage surge of FIG. 11A. The graph 1130 of FIG. 11C includes a trace 1135 that illustrates VC1 in response to the voltage surge of FIG. 11A. The graph 1140 of FIG. 11D includes a trace 1145 that illustrates VC1 in response to the voltage surge of FIG. 11A. As shown by FIGS. 11A-11D, when VCOM surges from 0 V to −24 V, VRAIL follows VCOM, while VC1 and VC2 decrease until they are clamped, respectively, by the diodes 610 and 615 of the voltage clamping block 600, e.g., at the clamping voltage for VC1 and VC2 discussed above with respect to FIGS. 9C and 9D. As also shown by FIGS. 11A-11D, when VCOM exponentially increases from −24 V to 0 V, VRAIL exponentially increases in correspondence with VCOM, while VC1 and VC2 slowly increase due to the reduction in respective gate-to-source voltages of the transistors 315 and 515, e.g., due to VCOM and VRAIL becoming less negative.

Figure 12A:
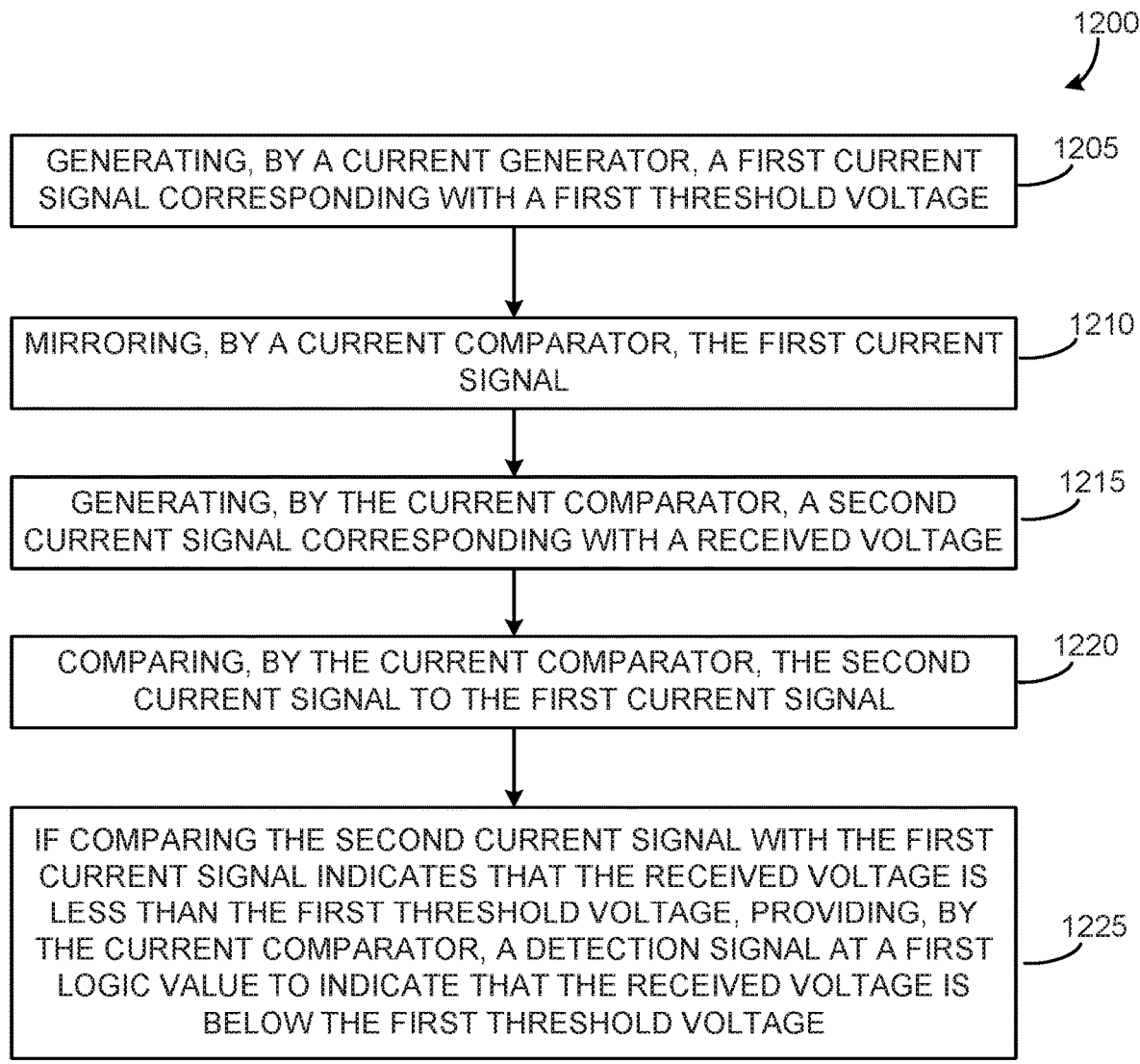
FIGS. 12A and 12B are flowcharts illustrating methods of detecting negative voltages that can be implemented in the circuits of FIGS. 1A and 2-6.
Figure 12B:
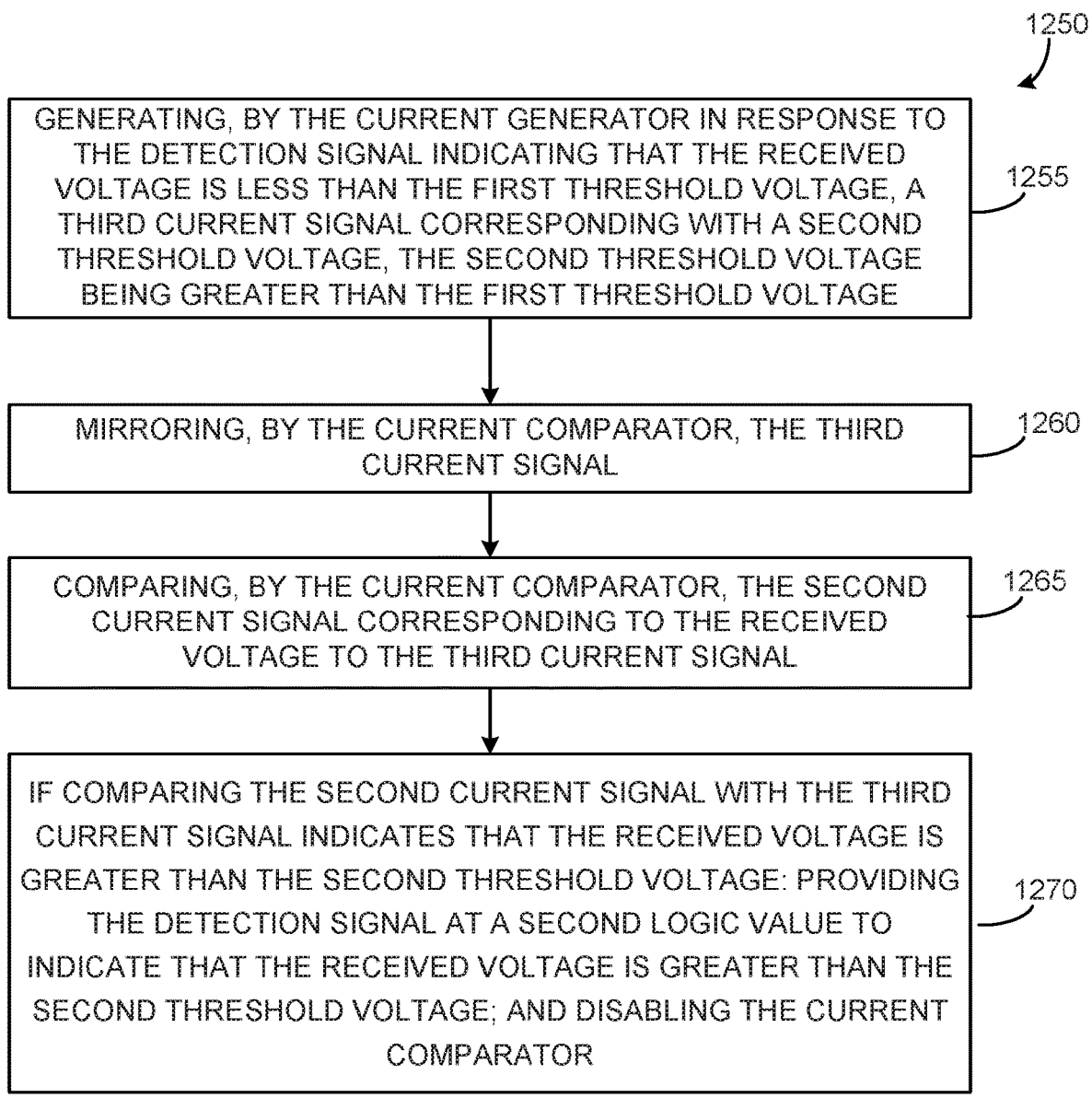

FIGS. 12A and 12B are flowcharts illustrating methods 1200 and 1250 for detecting negative voltages that can be implemented in the circuits of FIGS. 1A and 2-6. In certain implementations, the methods 1200 and 1250 can be performed in conjunction with one another. For instance, the method 1250 can be implemented in conjunction with the method 1200 to implement negative voltage detection with hysteresis, such as has been described herein. Also, for purposes of illustration, and by way of example, the methods 1200 and 1250 are described with further reference to the circuit 200.

In FIG. 12A, the method 1200 can include, at block 1205, generating, by the reference current generator 400, a first current signal representative of a first (negative voltage detection) threshold voltage. At block 1210, the method 1200 can include mirroring, by the current comparator 500, the first current signal. At block 1215, the method 1200 can include generating, by the current comparator 500, a second current signal representative of a received voltage. At block 1220, the method 1200 can include comparing, by the current comparator 500, the second current signal to the first current signal. At block 1225, the method can include, if comparing the second current signal with the first current signal at block 1220 indicates that the received voltage is less than the first threshold voltage, providing, by the current comparator 500, a detection signal at a first logic value to indicate that the received voltage is below the first threshold voltage.

As noted above, the method 1250 of FIG. 12B can be implemented in conjunction with the method 1200 of FIG. 12, e.g., to implement negative voltage detection with hysteresis in, e.g., the circuit 200. At block 1255 of FIG. 12B, the method 1250 can include generating, by the reference current generator 400 in response to the detection signal indicating that the received voltage is less than the first threshold voltage, a third current signal representative of a second, negative voltage detection threshold voltage (e.g., a hysteresis threshold voltage). The second threshold voltage can be greater than, e.g., less negative than, the first threshold voltage. At block 1260, the method 1250 can include mirroring, by the current comparator 500, the third current signal. At block 1265, the method 1250 can include comparing, by the current comparator 200, the second current signal corresponding to the received voltage to the third current signal. At block 1270, the method 1250 can include, if comparing the second current signal with the third current signal indicates that the received voltage is greater than the second threshold voltage: providing the detection signal at a second logic value to indicate that the received voltage is greater than the second threshold voltage; and disabling the current comparator 500. Block 1270 can also include disabling the reference current generator 400 if comparing the second current signal with the third current signal indicates that the received voltage is greater than the second threshold voltage.

The various apparatus and techniques described herein may be implemented using various semiconductor processing and/or packaging techniques. Some embodiments may be implemented using various types of semiconductor processing techniques associated with semiconductor substrates including, but not limited to, for example, Silicon (Si), Gallium Arsenide (GaAs), Silicon Carbide (SiC), and/or so forth.

It will also be understood that when an element, such as a layer, a region, or a substrate, is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present.

Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A circuit comprising:
   a reference current generator configured to generate a first current signal representative of a threshold voltage;
   a voltage selector configured to:
      select a lower voltage of a supply voltage of the circuit and an externally supplied voltage; and
      provide the selected voltage to a current comparator as a received voltage; and
   the current comparator being configured to:
      mirror the first current signal;
      generate a second current signal representative of the received voltage;
      compare the second current signal to the first current signal; and
      provide a detection signal at a first logic value to indicate that the received voltage is below the threshold voltage when the comparison of the second current signal with the first current signal indicates that the received voltage is less than the threshold voltage.

2. The circuit of claim 1, wherein the threshold voltage is a negative threshold voltage.

3. The circuit of claim 1, wherein the voltage selector includes a voltage clamp configured to clamp the received voltage to the supply voltage of the circuit when the externally supplied voltage exceeds the supply voltage of the circuit.

4. The circuit of claim 3, wherein the voltage clamp includes a Zener diode.

5. The circuit of claim 1, wherein the threshold voltage is a first threshold voltage, the circuit further comprising an enable circuit configured to generate an enable signal to enable the reference current generator if the received voltage is less than a second threshold voltage, the second threshold voltage being greater than the first threshold voltage.

6. The circuit of claim 5, wherein the current comparator is a first current comparator, the enable circuit including a second current comparator configured to generate the enable signal based on a comparison of the second current signal representative of the received voltage and a third current signal representative of the second threshold voltage.

7. The circuit of claim 1, wherein the threshold voltage is a first threshold voltage,
   the reference current generator being further configured, in response to the detection signal indicating that the received voltage is less than the first threshold voltage, to generate a third current signal representative of a second threshold voltage, the second threshold voltage being greater than the first threshold voltage, and
   the current comparator being further configured to:
      mirror the third current signal;
      compare the second current signal representative of the received voltage to the third current signal; and
   in response to the comparison of the second current signal with the third current signal indicating that the received voltage is greater than the second threshold voltage:
      provide the detection signal at a second logic value to indicate that the received voltage is greater than the second threshold voltage; and
      disable the current comparator.

8. A circuit comprising:
   a first current comparator configured to generate an enable signal based on a comparison of a first current signal representative of a received voltage and a second current signal representative of a first threshold voltage;
   a reference current generator configured to, in response to the enable signal, generate a third current signal representative of a second threshold voltage, the second threshold voltage being less than the first threshold voltage; and
   a second current comparator configured to:
      mirror the third current signal;
      compare the third current signal to the first current signal; and
      provide a detection signal at a first logic value to indicate that the received voltage is below the second threshold voltage when the comparison of the third current signal with the first current signal indicates that the received voltage is less than the second threshold voltage.

9. The circuit of claim 8, wherein the first threshold voltage and the second threshold voltage are, respectively, a first negative threshold voltage and a second negative threshold voltage.

10. The circuit of claim 8, further comprising a voltage selector configured to:
    select a lower voltage of a supply voltage of the circuit and an externally supplied voltage; and
    provide the selected voltage to the current first current comparator and the second current comparator as the received voltage.

11. The circuit of claim 10, wherein the voltage selector includes a voltage clamp configured to clamp the received voltage to the supply voltage of the circuit when the externally supplied voltage exceeds the supply voltage of the circuit.

12. The circuit of claim 8, wherein:
    the reference current generator is further configured, in response to the detection signal indicating that the received voltage is less than the second threshold voltage, to generate a third current signal representative of a third threshold voltage, the third threshold voltage being greater than the second threshold voltage, and the current comparator being further configured to:
mirror the third current signal;
compare the first current signal representative of the received voltage to the third current signal; and
if comparing the first current signal with the third current signal indicates that the received voltage is greater than the third threshold voltage:
provide the detection signal at a second logic value to indicate that the received voltage is greater than the third threshold voltage; and
provide a disable signal to the current comparator, the disable signal disabling the current comparator.

13. A method of operating a circuit, the method comprising:
generating, by a current generator, a first current signal representative of a first threshold voltage;
mirroring, by a current comparator, the first current signal;
generating, by the current comparator, a second current signal representative of a received voltage;
comparing, by the current comparator, the second current signal to the first current signal;
providing, by the current comparator, a detection signal at a first logic value to indicate that the received voltage is below the first threshold voltage when the comparing of the second current signal with the first current signal indicates that the received voltage is less than the first threshold voltage; and
generating an enable signal to enable the current generator in response to the received voltage being less than a second threshold voltage, the second threshold voltage being greater than the first threshold voltage.

14. The method of claim 13, wherein the first threshold voltage is a negative threshold voltage.

15. The method of claim 13, further comprising:
selecting a lower voltage of a supply voltage of the circuit and an externally supplied voltage; and
providing the selected voltage to the current comparator as the received voltage.

16. The method of claim 15, further comprising clamping the received voltage to the supply voltage of the circuit when the externally supplied voltage exceeds the supply voltage of the circuit.

17. The method of claim 13, wherein the current comparator is a first current comparator, the method further comprising, generating, by a second current comparator, the enable signal based on a comparison of the second current signal representative of the received voltage and a third current signal representative of the second threshold voltage.

18. The method of claim 13, the method further comprising:
generating, by the current generator in response to the detection signal indicating that the received voltage is less than the first threshold voltage, a third current signal representative of a third threshold voltage, the third threshold voltage being greater than the first threshold voltage,
mirroring, by the current comparator, the third current signal;
comparing, by the current comparator, the second current signal representative of the received voltage to the third current signal; and
if comparing the second current signal with the third current signal indicates that the received voltage is greater than the third threshold voltage:
providing the detection signal at a second logic value to indicate that the received voltage is greater than the third threshold voltage; and
disabling the current comparator.

* * * * *